Dec. 26, 1922.　1,439,975.
F. W. PETERSON.
AUXILIARY SPRING FOR PRESSURE GUAGES.
FILED NOV. 19, 1920.
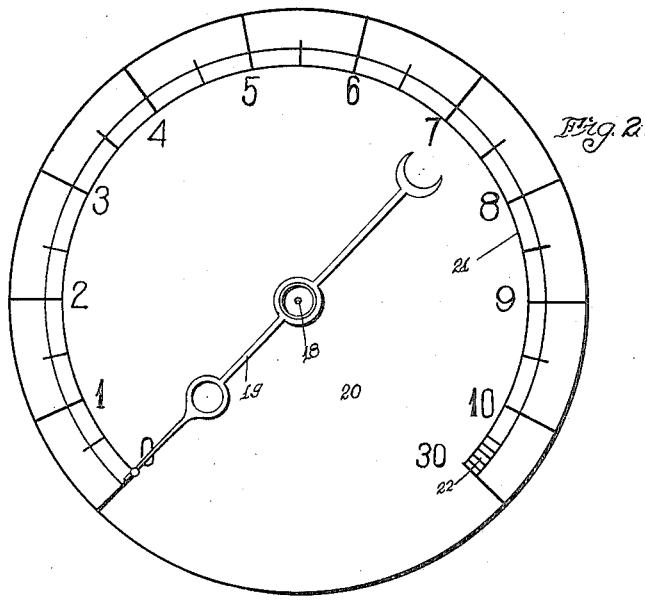
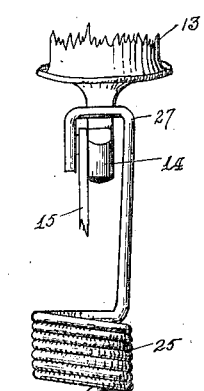
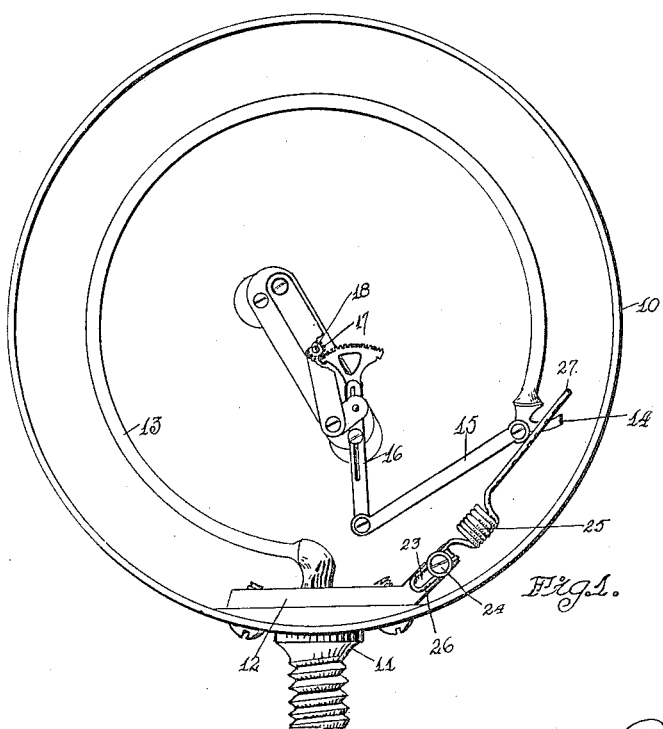
Inventor
F. W. Peterson,
by Orwig & Hague Att'ys Patented Dec. 26, 1922.

1,439,975

UNITED STATES PATENT OFFICE.

FRANK WHELDON PETERSON, OF CHICAGO, ILLINOIS.

AUXILIARY SPRING FOR PRESSURE GAUGES.

Application filed November 19, 1920. Serial No. 425,227.

*To all whom it may concern:*

Be it known that I, FRANK WHELDON PETERSON, a citizen of the United States, and a resident of Chicago, in the county of Cook and State of Illinois, have invented a certain new and useful Auxiliary Spring for Pressure Gauges, of which the following is a specification.

The object of my invention is to provide in a dynamometer having a graduated scale and a movable index member therefor, the movement of which from one graduation to another is designed to indicate a predetermined number of units of pressure or work performed, an attachment adapted to be adjustably applied to and to coact with the mechanism of said index member when the said member has reached a predetermined graduation on the dial, so that each of the remaining graduations may be made to read a greater number of units of pressure or work performed from which they were orginally intended to read.

More specifically it is the object of my invention to provide an attachment adapted to be applied to the Bourdon type of pressure gauge, having a circular tube for operating the index member, and which tends to straighten out when pressure is applied, and to provide in connection with such tube detachable and adjustable means whereby when the index member has reached a predetermined point on a graduated scale, the attachment will act on said tube in such a manner that when the index member registers one additional degree on said scale, it will represent a greater number of units of pressure than was originally represented by said degree of movement, and so constructed that when not in engagement with said tube member it will not interfere with the working of the original mechanism.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 is a back elevation of a Bourdon type of pressure gauge showing the manner in which my improved device is attached. The back of the said pressure gauge being removed for the purpose of showing the mechanism.

Figure 2 is a front elevation of the same showing the scale graduated as is used in connection with my improved device; and Figure 3 is a detail, end elevation of my improved device, showing fragments of the pressure gauge.

Referring to the accompanying drawings I have used the reference numeral 10 to indicate the casing of a pressure gauge which is of the Bourdon type. The said gauge being provided with a screw-threaded portion 11 which is designed to be mounted in the usual manner. The bottom portion of the casing 10 is provided with a base member 12, which is designed to carry the Bourdon tube 13, one end of which is operatively connected with the pipe 11. The opposite end of the tube 13 is provided with a hook member 14, which is pivotally connected to a link 15, said link being operatively connected with the dial operating gears and pinion 17.

The pinion 17 is mounted on a shaft 18 which is designed to carry the index member 19. This member 19 is mounted adjacent to a graduated scale 20, which is provided with a series of circular graduations 21. The graduations ranging from one to ten, and being spaced equal distance apart. I have provided an additional graduation 22, the purpose of which will be explained later.

It will be evident from Figure 2 that the graduation scale indicated thereon is designed for low pressure work which requires a comparatively accurate reading, but it often happens that it is desirable to use such a pressure gauge in work which requires a certain degree of accuracy under low pressures, but which may be also capable of indicating less accurately higher pressures. To accomplish this without providing an independent mechanism for indicating the higher pressure, I have provided means that may be attached to the low pressure gauge which will roughly indicate the higher pressure by providing an additional graduated scale indicated by the numeral 22; said attachment being used in connection with the ordinary mechanism without interfering with the same while working under low pressure.

To accomplish this I have provided on the member 12 an inclined extension 23, which is designed to carry a set-screw 24 which is operatively connected with a spring member 25; said spring 25 being provided with a U-shaped loop 26 so as to provide adjustment between the member 23 and the said spring member.

The opposite end of the spring 25 is provided with a loop 27 which is so constructed that it will surround the hook member 14, as clearly shown in Figures 1 and 3.

In Figure 1 I have shown the free end of the tube 13 and the hook member 14 in its normal position, or in that position in which the index 19 indicates zero on the graduated scale.

When pressure is applied to the tube 13, it will expand slightly and the hook member 14 will be moved upwardly which will cause the index 19 to travel over the scale 21.

When the said index has reached the position 10, the loop 27 is adjusted by means of the set-screw 24, so that it is just engaged by the said hook 14.

A further movement of the member 14 caused by an increase in pressure within the tube 13, will be retarded by the tension of the spring 25 in such a manner that when the index 19 has passed through a space equal to one degree on the scale 21, it may be made to indicate a pressure equal to twenty of the original degrees, which would in this particular case be thirty, as indicated on the said scale.

A greater number of degrees, however, may be made to read in the said space by increasing the size of the spring 25 or vice versa.

Thus it will be seen that I have provided an attachment of simple, durable and inexpensive construction which may be used in connection with and attached to the ordinary pressure gauge in such a manner that the said pressure gauge may be used to indicate higher pressures than from which the said gauge was originally intended, or the attachment may be built in and made a part of the gauge if so desired.

Some changes may be made in the construction and arrangement of the parts of my improved device without departing from the real spirit and purpose of my invention, and it is my intention to cover by my claims any modified forms of structure or use of mechanical equivalents which may be reasonably included within their scope.

I claim as my invention:

1. A pressure gauge comprising a casing having a graduated scale of equal divisions, some of said divisions being provided with characters to indicate single units of pressure, the remaining divisions being subdivided and provided with characters to indicate a plurality of units of pressure, an index member mounted in operative relation with said scale, means for operating said index member comprising a Bourdon tube having one end rigidly connected to said casing and its other end provided with a hook, means operatively connected to the free end of said tube for actuating said index member, the said mechanism being so arranged that as pressure is applied to the said tube the index member will move over the division indicating single units of pressure, a retarding device designed to engage the free end of said Bourdon tube as the indicator reaches the divisions having the characters indicating a plurality of units, said device comprising a helical spring having each of its ends provided with a longitudinally arranged portion, one of said portions being provided with a loop, means for adjustably securing said loop portion to the casing of said gauge, the opposite longitudinal member of said spring being provided with a loop designed to be engaged by the hook of said Bourdon tube when the index member has reached the division indicating a plurality of units, the longitudinal axis of said spring being arranged in a tangential relation with said Bourdon tube.

2. A pressure gauge comprising a casing, an index member, a Bourdon tube having one end fixed to said casing and the other end provided with a hook, means operatively connected to the free end of said Bourdon tube for operating said index member, a helical spring, having each of its ends provided with a longitudinally arranged portion, one of said portions being provided with a loop, means for adjustably securing said loop portion to the casing of said gauge, the opposite longitudinal member of said spring being provided with a loop designed to be engaged by the hook of said Bourdon tube when the said index member has reached a pre-determined position, the longitudinal axis of said spring being arranged in a tangential relation with said Bourdon tube.

Des Moines, Iowa, November 4, 1920.

FRANK WHELDON PETERSON.